US006697091B1

(12) United States Patent
Rzepkowski et al.

(10) Patent No.: US 6,697,091 B1
(45) Date of Patent: Feb. 24, 2004

(54) SYSTEMS, METHODS AND GRAPHICAL USER INTERFACES FOR INDICATING A DESIRED ORIGINAL DOCUMENT ORIENTATION FOR IMAGE CAPTURE DEVICES

(75) Inventors: Kristinn R. Rzepkowski, Rochester, NY (US); Rudolph A. Rodrigues, Rochester, NY (US); Daniel L. Young, Palmyra, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,272

(22) Filed: Jan. 19, 2000

(51) Int. Cl.[7] .............................. G06F 3/00; H04N 1/40
(52) U.S. Cl. ...................... 345/835; 345/689; 345/846; 358/442; 399/81; 715/527
(58) Field of Search ................................. 345/689, 764, 345/835, 838, 839, 840, 846; 358/401, 442, 443, 448, 451, 453, 468; 707/517, 521, 523, 526, 527; 715/517, 520, 521, 526, 527, 530; 399/81, 182; 361/681

(56) References Cited

U.S. PATENT DOCUMENTS

| | | | |
|---|---|---|---|
| 5,260,805 A | * 11/1993 | Barrett ..................... 345/451 X |
| 5,301,036 A | * 4/1994 | Barrett et al. ................ 358/448 |
| 6,252,677 B1 | * 6/2001 | Hawes et al. ................. 358/1.9 |
| 6,298,172 B1 | * 10/2001 | Arney et al. ............ 707/527 X |
| 6,332,149 B1 | * 12/2001 | Warmus et al. .............. 707/517 |
| 6,373,507 B1 | * 4/2002 | Camara et al. ............. 345/825 |
| 6,466,302 B1 | * 10/2002 | Rousseau et al. ............. 355/61 |

OTHER PUBLICATIONS

Bill Camarda et al., "Using Microsoft Word 97", 1997, QUE Corporation, p. 98, 99, 107, 348–51.*
William Newman et al, "A Video–based Tool for Efficient Capture from Paper Source Documents", Jul. 1999, Xerox, vol. 2, pp. 647–653.*

* cited by examiner

Primary Examiner—John Cabeca
Assistant Examiner—X. L. Bautista
(74) Attorney, Agent, or Firm—Oliff & Berridge, PLC

(57) ABSTRACT

Because an original document is often incorrectly loaded into an image capture device, the resulting captured image is often upside down, rotated 90°, or cut off. This occurs even though image capture devices have markings that indicate how the original documents are to be put into the scanner, markings that are often ignored when the original documents are loaded into the image capture device. Input orientation systems, methods and graphical user interfaces provide graphical document orientation indicators, or "input document mimics", that provides visual indications to the user of the orientation of the original document to be captured and of the image on the original document, that will result in the desired orientation of the captured image being obtained. Based on various selected image capture parameters, the input orientation systems, methods and graphical user interfaces display one or more visual cues to the user that indicate the orientation of the original document and of the image that will allow the image capture device to capture an image of the original document that corresponds to the selected image capture parameters. An image orientation portion of an input orientation graphical user interface allows the user to specify the orientation of the original document to be used when capturing an image of the original documents. The input orientation systems, methods and graphical user interfaces aid the user in selecting the proper image capture parameters that should be used with the selected orientation of the original document.

37 Claims, 11 Drawing Sheets

SYSTEMS, METHODS AND GRAPHICAL USER INTERFACES FOR INDICATING A DESIRED ORIGINAL DOCUMENT ORIENTATION FOR IMAGE CAPTURE DEVICES

BACKGROUND OF THE INVENTION

1. Field of Invention

This invention is directed to a graphical user interface for an image capture device, such as a scanner.

2. Description of Related Art

Scanners and other types of image capture devices have become ubiquitous office productivity tools for generating electronic images of physical original documents. Once an electronic image of a physical original document has been generated, the electronic image data can be used in an infinite variety of ways to increase the productivity and the product quality of an office. Such image capture devices include desktop scanners, other stand-alone scanners, digital still cameras, digital video cameras, the scanning input portions of digital copiers, facsimile machines and other multi-function devices that are capable of generating electronic image data from an original document, and the like. These image capture devices can also include image databases that store previously captured electronic image data.

However, as the cost of scanners and other image capture devices has dropped and the output quality of the captured electronic image data has improved, scanners and other image capture devices have been provided with an ever-increasing number of controllable features. Similarly, as users have become comfortable with capturing and using electronic image data obtained from original documents, the uses to which the electronic image data has been put, and thus the needed control over the quality and appearance of the electronic image data, have expanded greatly.

In response, standard interfaces between such image capture devices, including those indicated above, and the various application programs that use such captured electronic image data have been developed. These standard interfaces allow standard-compliant image capture devices and standard-compliant applications to easily communicate. One exemplary embodiment of such a standard interface is the TWAIN™ interface. The TWAIN™ interface allows any TWAIN™-compliant application program to input and use electronic image data using any TWAIN™-compliant image capture device.

SUMMARY OF THE INVENTION

The TWAIN™-compliant component protocol facilitates communication between application programs and image capture devices, such as those indicated above. One such TWAIN™ image capture device is the XEROX® Digi-Path™ scanner.

The ever-increasing numbers of features provided by image capturing devices such as the Xerox® DigiPath™ scanner cause users of these image capturing devices to find it increasingly difficult to obtain the desired scanning results. For example, original documents are often provided to an image capture device in such a way that the resulting captured images, when provided to an imaging application, are upside down, rotated 90°, or cut off. These incorrect orientations occur because the original documents were incorrectly loaded into the image capture device. Typically, image capture devices, such as the exemplary production scanner 100 shown in FIG. 1, have markings on the document handler 130 that indicate how the original documents are to be put into the scanner. Unfortunately, these markings are often, if not usually, ignored when the original documents are loaded into the document handler 130 in favor of a desired orientation of the user. As can be imagined, this is particularly troublesome when a large number of original documents are placed into an automatic document handler in the wrong orientation, such that a large number of essentially unusable image capture operations are performed.

This invention thus provides systems, methods and graphical user interfaces that allow the user to select the orientation of an image capture operation of an original document.

This invention separately provides systems, methods and graphical user interfaces that indicate to an operator the orientation an original document should have when fed into the image capture device to obtain a captured image having the desired orientation In various exemplary embodiments of the systems, methods and graphical user interfaces of this invention, a document orientation portion, or input document mimic, of the graphical user interfaces provides a visual indication to the user of the orientation of the original documents to be captured that will result in the desired orientation of the captured image being obtained. In particular, based on various selected image capture parameters input by the user, the systems, methods and graphical user interfaces of this invention determine and display one or more visual cues to the user that indicate the orientation of the original document that will allow the image capture device to capture an image of the original document that corresponds to the image capture parameters selected by the user. In various other exemplary embodiments of the systems, methods and graphical user interfaces of this invention, an image orientation portion of the graphical user interfaces allows the user to specify the orientation of the original document to be used when capturing an image of the original documents. In response, the systems, methods and graphical user interfaces of this invention aid the user in selecting the proper other image capture parameters that should be used with the selected orientation of the original document.

These and other features and advantages of this invention are described in or are apparent from the following detailed description of various embodiments of the systems, methods and graphical user interfaces according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
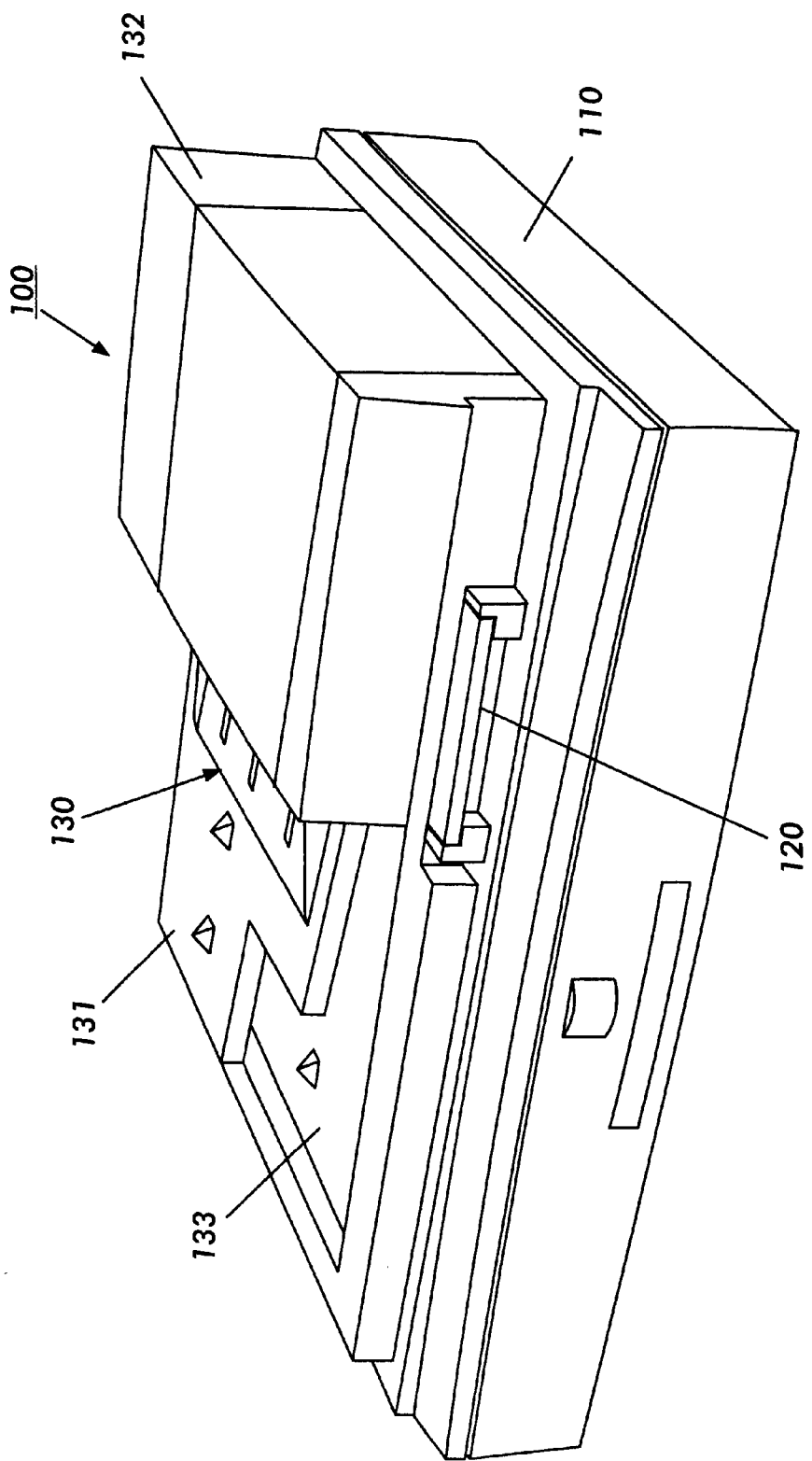
FIG. 1 is a perspective drawing of an exemplary electronic image generating device.

FIG. 1 illustrates a first exemplary embodiment of an electronic image data capturing device 100 usable with the image previewing systems, methods and graphical user interfaces of this invention. As shown in FIG. 1, the electronic image data capture device 100 includes a control panel 110, a document platen 120 on which an original document can be placed to generate corresponding electronic image data and a document handler 130. In particular, the document handler 130 includes a feed tray 131 on which the original document can be placed and a document feeder 132 which moves each document in turn from the feed tray 131 and feeds the removed document to the document platen 120. Each document is then returned to an output tray 133 after electronic image data is generated from that original document.

It should be appreciated that the electronic image data capture device can also be referred to as variously, a scanner, an image capture device, an electronic image data generating device, or the like, and, regardless of the name, can be any one of a stand-alone scanner, a digital copier, a facsimile machine, a multi-function device, a digital still camera, a digital video camera, an electronic image database storing previously generated electronic image data, or any other known or later device that is capable of generating (or supplying) electronic image data from an original document.

Figure 2:
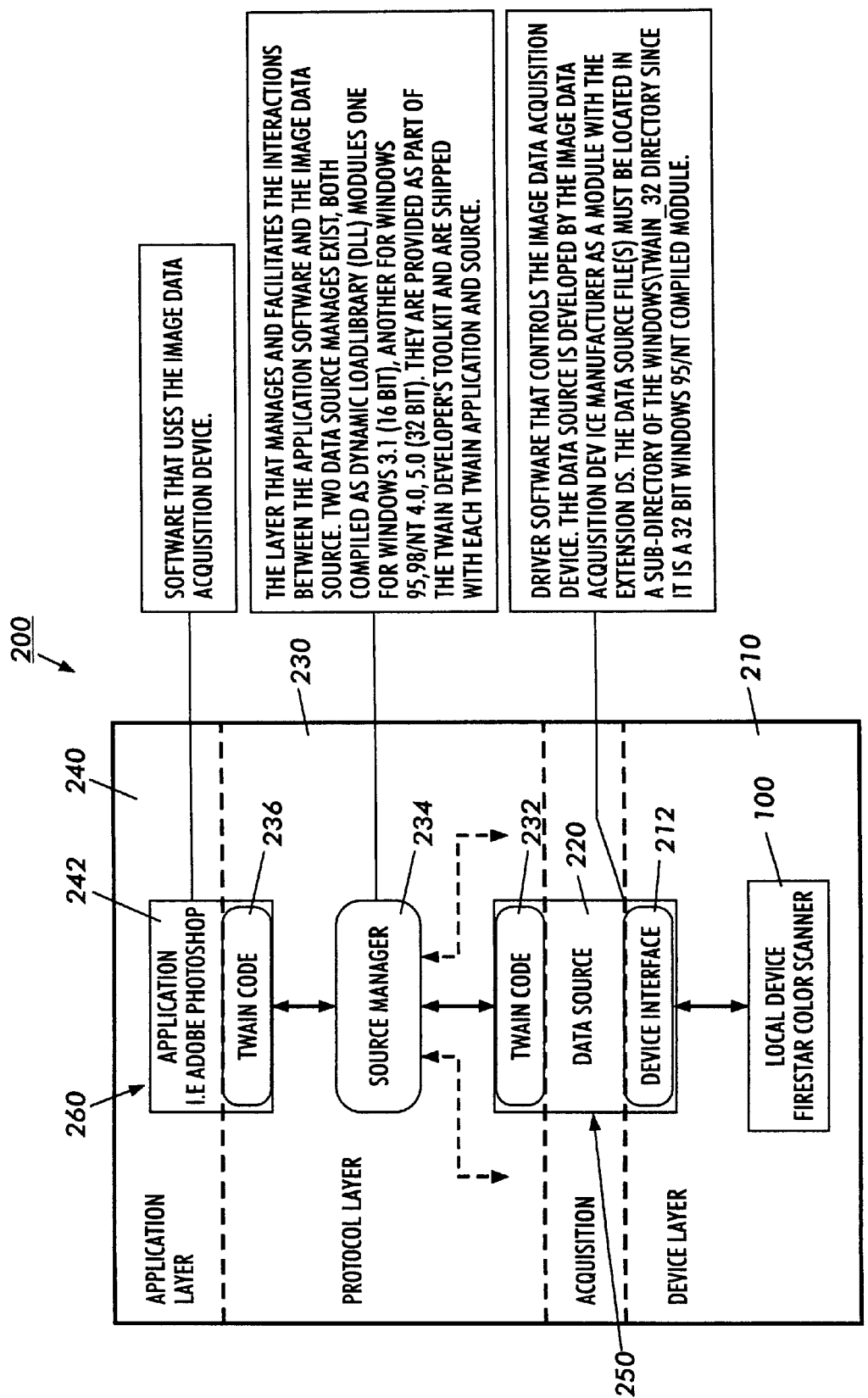
FIG. 2 is a block diagram illustrating a first exemplary embodiment of the structure of an image capture device control system that incorporates the various exemplary embodiments of the image previewing systems, methods and graphical user interfaces of this invention.

FIG. 2 is a block diagram illustrating a first exemplary embodiment of the structural organization of an image capture device control system 200 that incorporates the image previewing systems, methods and graphical user interfaces according to this invention. As shown in FIG. 2, the image capture device control system 200 includes a device layer 210, an acquisition layer 220, a protocol layer 230, and an application layer 240. In particular, the device layer 210 includes the image capture device 100, such as a Xerox® DigiPath™ color scanner or any of the other electronic image data capture devices indicated above. The device layer 210 also includes a device interface portion 212 of a TWAIN™ driver, or TWAIN™ data source, 250. In particular, as shown in FIG. 2, the TWAIN™ driver (or data source) 250 bridges the device layer 210, the acquisition layer 220 and the protocol layer 230.

The protocol layer 230 includes a TWAIN™ code portion 232 of the TWAN™ driver (or data source) 250, a source manager 234 and a TWAIN™ code portion 236 of a TWAIN™-compliant application 260. The application layer 240 includes the application portion 242 of the application 260.

As shown in FIG. 2, control and data signals are provided from the electronic image data capture device 100 to the TWAIN™ driver (or data source) 250 through the device interface portion 212 of the TWAIN™ driver (or data source) 250. Similarly, control and data signals between the TWAIN™ driver (or data source) 250 and the source manager through the TWAIN™ code portion 232 of the TWAIN™ driver (or data source) 250. The control and/or data signals are also provided between the source manager 234 and the application 260 through the TWAIN™ code portion 236. In various exemplary embodiments, the TWAIN™ driver (or data source) 250 controls the electronic image data capture device 100. In various ones of these exemplary embodiments, the TWAIN™ driver or data source 250 is developed by the manufacturer of the electronic image data capture device 100.

The source manager 234 manages and facilitates the interactions between the application 260 and the TWAIN™ driver or data source 250. In various exemplary embodiments, one or more of two distinct source managers 234 have been implemented. Both are compiled as dynamic loading library modules. One exemplary dynamic load library implementation of the source manager 234 is a 16-bit program developed for, for example, Microsoft® Windows® 3.1. The other dynamic load library implementation of the source manager 234 is a 32-bit program developed for Windows® 95/98 and Windows® NT 4.0/5.0. In general, these two dynamic load library modules are provided as part of the TWAIN™ developers tool kit and are shipped with each TWAIN™-compliant application and at each TWAIN™-compliant electronic image data generating device.

Figure 3:
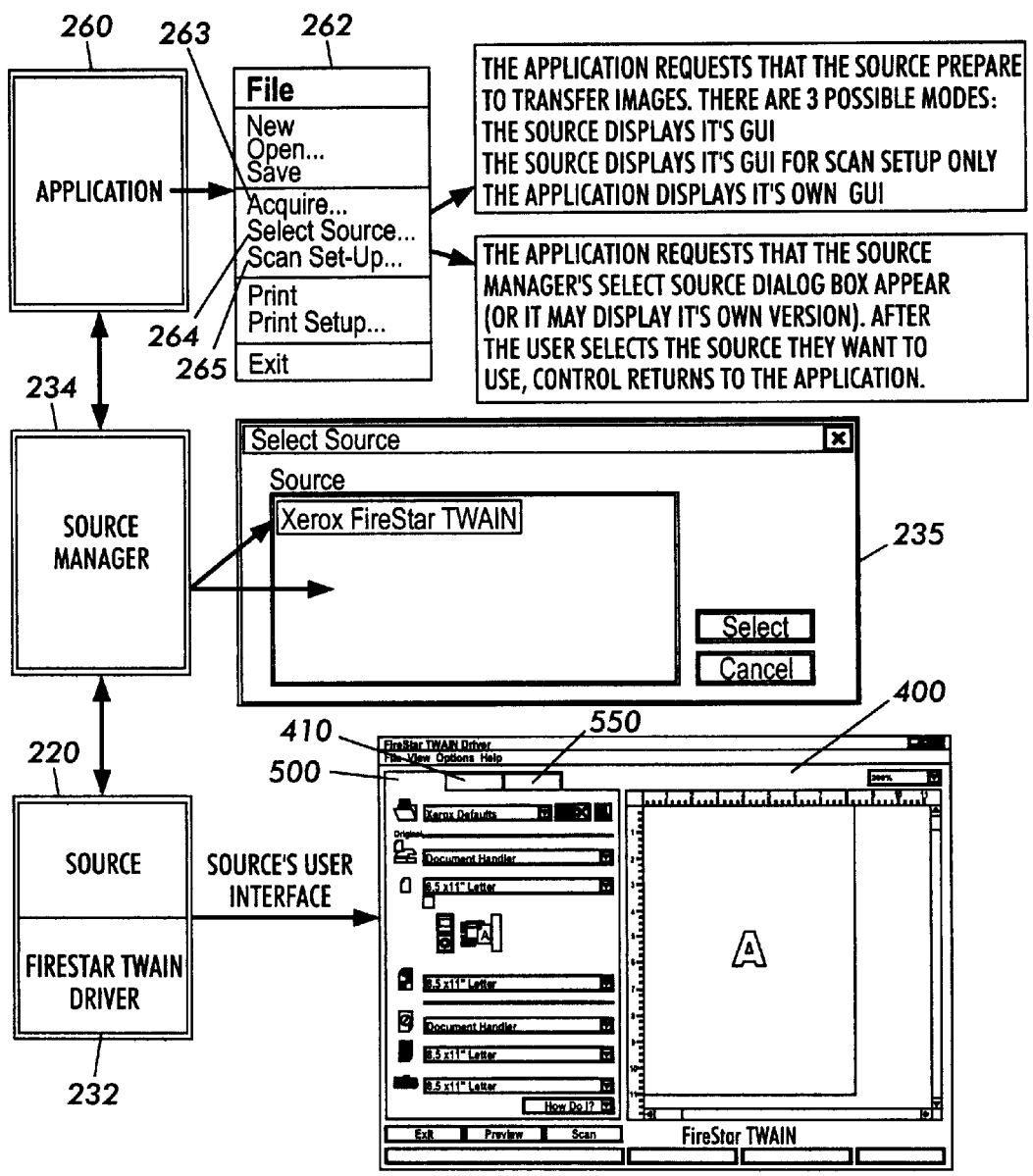
FIG. 3 is a second exemplary embodiment of an image capture and usage system that incorporates the systems and methods of this invention.

FIG. 3 illustrates one exemplary embodiment for accessing the systems, methods and graphical user interfaces according to this invention. As shown in FIG. 3, a FILE menu 262 of a TWAIN™ compliant application 260 will include a plurality of menu items that provide an interface to a TWAIN™ compliant electronic image data capture device 100, such as a TWAIN™-compliant scanner. These menu items include various ones of at least an Acquire menu item 263, a Select Source menu item 264 or a Scan Set-Up menu item 265.

As shown in FIG. 3, selecting the Acquire menu item 263 causes the application 260 to request that the electronic image data capture device 100 prepare to capture electronic image data from an original document and/or transfer capture electronic image data to the image capture device control system. In particular, in response to the selecting the Acquire menu item 263, the application 260 can display its own graphical user interface. Alternatively, the TWAIN™ driver (or data source) 250 for the selected electronic image data capture device can display one of its graphical user interfaces. Finally, if the Scan Set up menu item 265 was selected, the TWAIN™ driver (or data source) 250 can display a specific Scanner Set-Up graphical user interface.

In particular, as shown in FIG. 3, when any of the menu items 263–265 are selected, the application 260 calls the source manager 234. In response, the source manager accesses each TWAIN™ driver (or data source) 250 that is present in the image capture device control system 200. The source manager 234 then displays, in a graphical user interface 235, all of the different TWAIN™ drivers (or data sources) 250 present on the image capture device control system 200. Once the user selects the particular TWAIN™ driver (or data source) 250 that the user wishes to use, the TWAIN™ driver (or data source) 250 will display a graphical user interface 400 that allows the user to select various ones of the image capture parameters and scanning control functions implemented in that TWAIN™ driver (or data source) 250.

Figure 4:
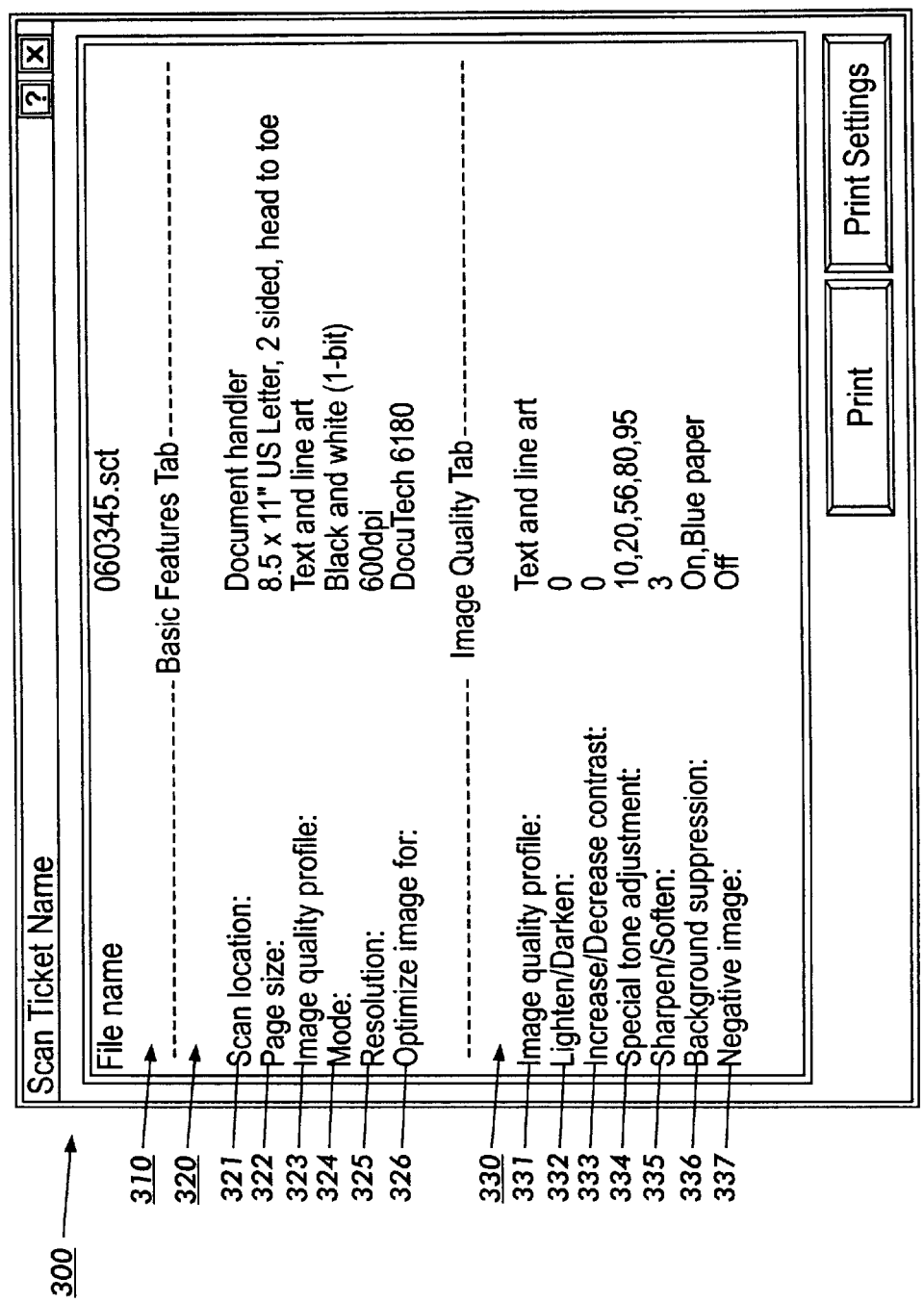
FIG. 4 is an exemplary embodiment of a scan ticket illustrating various image scanning parameters according to this invention.

FIG. 4 illustrates one exemplary embodiment of a scan ticket 300. Scan tickets contain all of the settings in the TWAIN™ graphical user interface 400, which is discussed in greater detail below. In general, there will be a set of one or more sets of saved scan parameters, or "scan tickets" for each language supported the TWAIN™ driver (or data source) 250 according to this invention. When the TWAIN™ graphical user interface 400 is displayed, only those sets of saved scan parameters, or "scan tickets" for the language the user is currently operating in are displayed. When a set of saved scan parameters, i.e., a "scan ticket", is selected, all the settings contained within that scan ticket are used to populate the TWAIN™ graphical user interface 400 according to this invention.

As shown in FIG. 4, a scan ticket 300 includes at least a file name portion 310, a basic features portion 320, an image quality portion 330 and an image size portion (not shown). The basic features portion 320 corresponds to the basic features tab 500 of the TWAIN™ graphical user interface 400 shown in FIG. 3. Similarly, the image quality portion 330 and the image size portion correspond to the image quality tab 410 and the image size tab 550, respectively, of the graphical user interface 400 shown in FIG. 3. The image quality tab 410 is described in greater detail in U.S. patent application Ser. No. 09/487,271, filed Jan. 19, 2000, and incorporated herein by reference in its entirety.

As shown in FIG. 4, the basic features portion 320 includes a scan location parameter 321, an input original document size parameter 322, an original image quality profile parameter 323, a mode parameter 324, a resolution parameter 325, and image optimization parameter 326. The image quality portion 330 includes an image quality profile parameter 331, a brightness parameter 332, an increase/decrease parameter 333, a special tone adjustments parameter 334, a sharpen/soften parameter 335, a background suppression parameter 336 and a negative image parameter 337.

In particular, the scan location parameter 321 indicates the particular electronic image capture device that is to be used to capture electronic image data from a particular original document. The page size parameter portion 322 indicates the size of the input document, whether the input document is single-sided or double-sided, and, if the original document is double-sided, how the two images on each side of the original document are oriented relative to each other. The image quality profile portion 323 indicates image characteristics of and enhancements to be applied to the original document when it is made into its electronic form. Image quality profiles are described in greater detail in U.S. patent application Ser. No. 09/487,269, filed Jan. 19, 2000 and incorporated herein by reference in its entirety. The mode portion 324 indicates the particular image capture mode to be used. For example, the image of the original document could be captured as a binary bitmap image, as shown in FIG. 4 or, as an 8-bit grayscale image, or as a color image having various color spaces and bit depths.

The resolution portion 325 indicates the resolution of the generated electronic image data. The image optimization portion 326 indicates a particular output device, such as a particular laser printer, a particular ink jet printer, a particular digital copier, or the like, that will be used to generate hard copies of the generated electronic image data and thus for which the electronic image data should be optimized for when the electronic image data of the original document is captured.

The image quality profile parameter 331 of the image quality portion 330 is the same as the image quality profile parameter 323. The lighten/darken parameter 332 indicates whether the electronic image data is to be lighter or darker than the images on the original document. Similarly, the increase/decrease contrast parameter portion 333 indicates whether the contrast of the electronic image data is to be greater or less than the contrast of the images on the original document. The special tone adjustment parameter portion 334 is used to provide finer control over the tone reproduction curve that is used to convert the continuous tone image values of the original document to the multi-bit-depth image values of the generated electronic image data. This is described in greater detail in the incorporated 271 application.

The sharpen/soften parameter portion 335 used to indicate whether the edges within the images in the original document should be sharpened or softened in the generated electronic image data. The background suppression parameter portion 336 is used to indicate whether background suppression should be used, and if so, the color or other quality of the background of the original document that is to be suppressed. The negative image parameter portion 337 indicates whether the generated electronic image data should be a negative image relative to the images on the original document. Various other ones of the particular scanning parameters discussed above are further disclosed in U.S. patent application Ser. Nos. 09/487,273, 09/487,274 and 09/487,266, each filed Jan. 19, 2000 and each incorporated herein by reference in its entirety.

Figure 5:
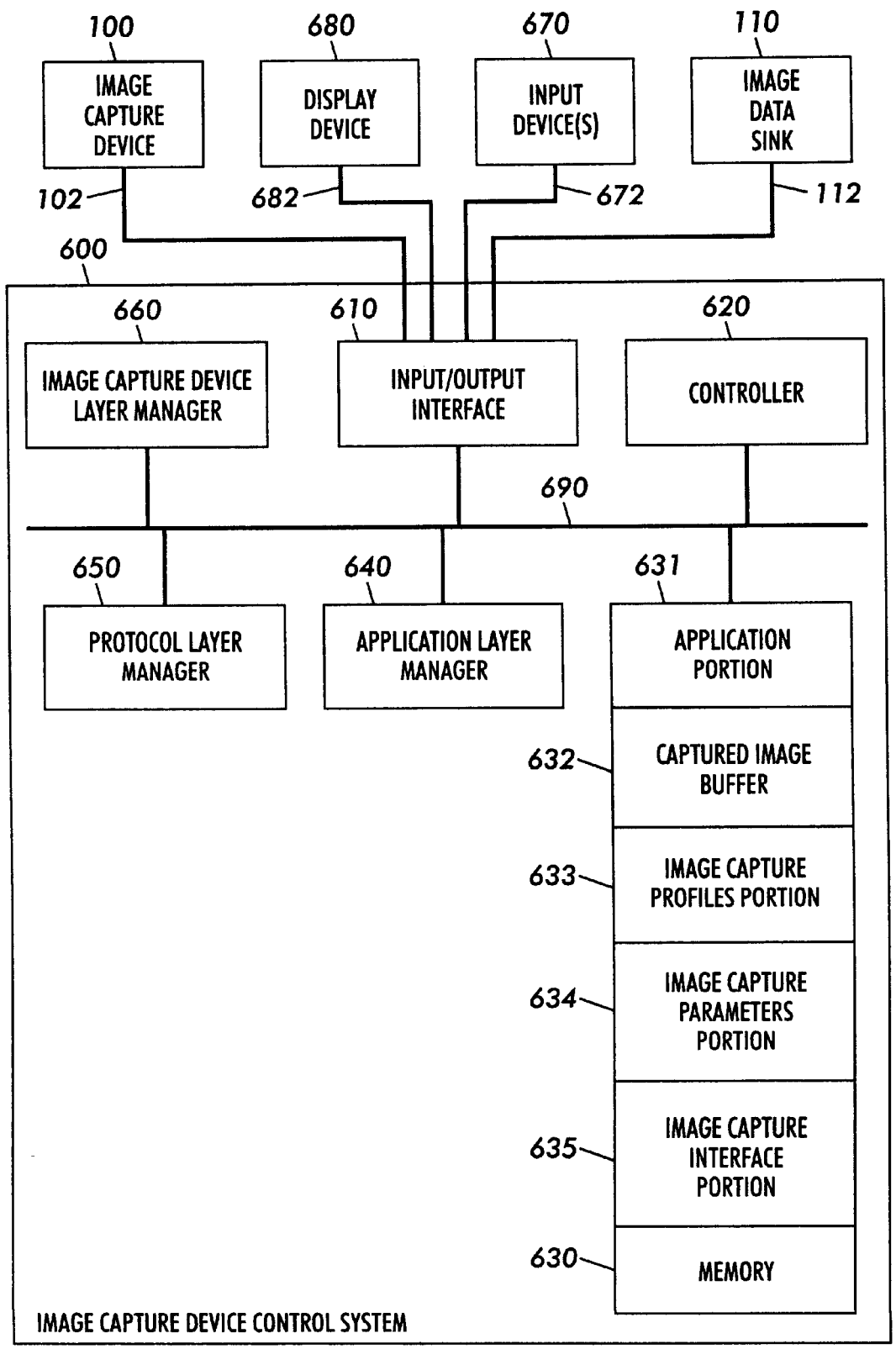
FIG. 5 is a block diagram of a second exemplary embodiment of the image capture control system that incorporates the image previewing systems, methods and graphical user interfaces of this invention.

FIG. 5 is a block diagram illustrating a second exemplary embodiment of the structural organization of an image captured device control system 600 that incorporates the image previewing systems methods and graphical user interfaces according to this invention. As shown in FIG. 5, the image capture device control system 600 includes an input/output interface 610, a controller 620, a memory 630, an application layer manager 640, a protocol layer manager 650, and an image capture device layer manager 600, each interconnected by a data/control bus 690.

The image capture device 100 is connected to the input/output interface 610 using a link 102. Similarly, an image data sink 110 can be connected to the input/output interface 610 using a link 112. The links 102 and 112 can each be any known or later developed device or system for connecting the image capture device 100 and the image data sink 110, respectively, to the image capture device control 600, including a direct cable connection, a connection over a wide area network or a local area network, a connection over an intranet, a connection over an extranet, a connection over the Internet, or a connection over any other distributed processing network or system. In general, the links 102 and 112 can each be any known or later developed connection system or structure usable to respectively connect the image capture device 100 and the image data sink 110 to the image capture device control system 600. It should also be appreciated that the links 102 and 112 can be wired or wireless links that use portions of the public switch telephone network and/or portions of a cellular communication network.

It should also be appreciated that, in general, the image data sink 110 can be any device that is capable of outputting or storing electronic images generated using the image capture device control system 600 using the systems, methods and graphical user interfaces according to this invention, such as a printer, a copier, any other image forming device, a facsimile device, a display device, a storage device, or the like.

While FIG. 5 shows the image capture device 100, the image capture device control system 600 and the image data sink 110 as separate devices, the image capture device control system 600 may be integrated with either or both of the image capture device 100 and/or the image data sink 110, such as, for example, in a digital copier. With such a configuration, for example, the image capture device 100, the image data sink 110 and the image capture device control system 600 may be contained within a single device.

The input device or devices 670 can include any one or more of a mouse, a keyboard, a touch pad, a track ball, a touch screen, or the like, or any other known or later developed device that is capable of inputting data and control signals over the link 672 to the input/output interface 610. Similarly, the display device 680 can be any known or later developed display device, including a cathode ray tube type monitor, a flat screen type monitor, an LCD monitor, or any other known or later developed device on which the graphical user interfaces according to this invention can be displayed and interacted with using one or more of the input devices 670. The display device 680 is provided with control and/or data signals from the input/output interface 610 over the link 682.

Like the signal lines 102 and 112, the links 672 and 682 can be any known or later developed device or system for connecting the input devices 670 and the display device 680, respectively, to the image capture device control system 600, including a direct cable connection, a connection over a wide area network or local area network, a connection over a intranet, a connection over an extranet, a connection over the Internet, a connection over the public switched telephone network, a connection over a cellular network, or a connection over any other distributed processing or communications network or system, including both or either wired and wireless systems. In general, the links 672 and 682 can each be any known or later developed connection system or structure usable to connect the input devices 670 and the display device 680, respectively, to the image capture device control system 600.

The memory 630 includes an application portion 631 in which an application program and any application files used by that application program can be stored. Similarly, the captured image buffer 632 is used to store the captured image data input from the image capture device 110 over the signal line 102 and through the input/output interface 610. In general, the captured electronic image data will be stored in the captured image buffer 632 under control of the controller 620 the image capture device layer manager 660, the protocol layer manager 650 and/or the application layer manager 640.

The image capture profiles portion 633 stores the image capture profiles, as set forth in the incorporate 269 application, as well as job tickets 300, and the like. The image capture parameters portion 634 stores a current set of the image capture parameters to be used by the image capture device 100 when capturing an image. The image capture interface portion 635 stores the various graphical user interfaces shown in FIGS. 3, 4, and 6 and as described above and in detailed below.

The application layer manager 640 manages the application layer 240, and in particular, the application portions 242 of any executing applications 260.

The protocol layer manager 650 manages the protocol layer 230, including the source manager 234. The protocol layer manager 650 communications with the application layer manager 640 using the TWAIN™ application programming interfaces 236 of the executing applications 260.

The image capture device layer manager 660 manages each of the TWAIN™ drivers (or data sources) 250 that may be implemented for different ones of the image capture devices 100 that may be accessible by the image capture device control system 600 over various ones of the links 102. In particular, the image capture device layer manager 660 communicates with the protocol layer manager 650 using the acquisition layer application programming interface 232 of the particular TWAIN™ driver (or data source) 250. Similarly, the image capture device layer manager 660 communications with the image capture device 100 through the input/output interface 610 and over the link 102 using the device interface portion 212.

The image capture device layer manager 660 causes various ones of the image capture graphical user interfaces, such as the graphical user interface 400 shown in FIG. 3, to be displayed on the display device 680. The user can then change and/or input the various image capture parameters. The various image capture parameters can be input through the various graphical user interfaces that the image capture device layer manager 660 displays on the display device 680. Then, after the user saves the various image capture parameters or initiates the corresponding image capture device, the image capture device layer manager 660 stores the selected image capture parameters in the image capture parameters portion 640. The image capture device layer manager 660 then outputs the selected image capture parameters through the input/output interface 610 and over the link 102 to the image capture device 100. The image capture device 100 then uses the various image capture parameters received from the image capture device control system 600 when capturing electronic image data from an original document and when supplying that capture electronic image data over the link 110 to the image capture device control system 600.

Figure 6:
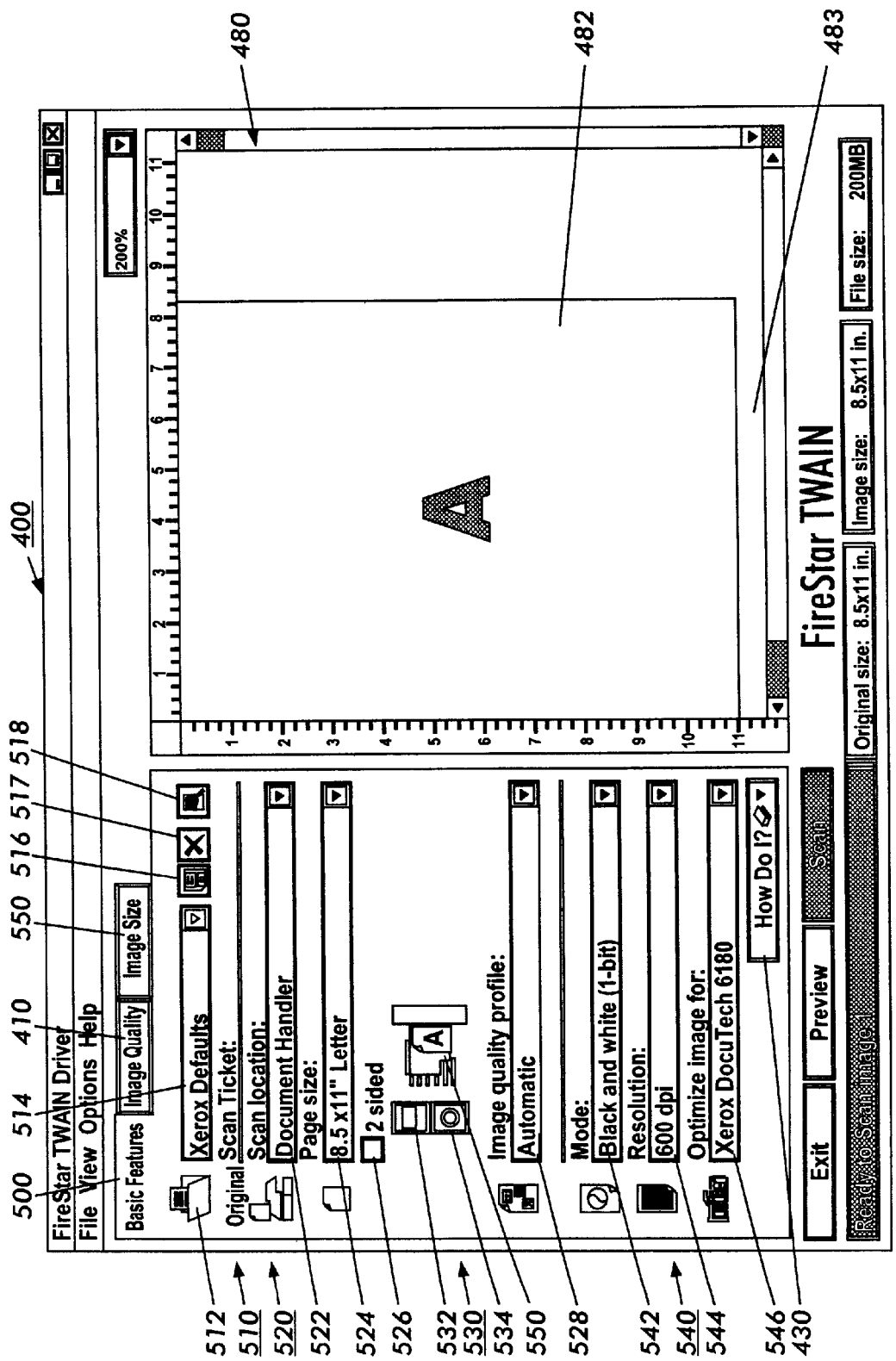
FIG. 6 is a graphical user interface incorporating the document orientation portion according to this invention.

FIG. 6 shows one exemplary embodiment of the graphical user interface 400 including a document orientation portion 530. As shown in FIG. 6, the graphical user interface 400 includes the image quality tab 410 and the image size tab 550 in addition to the basic features tab 500. The basic features tab 500 includes a scan ticket portion 510, an original document parameters portion 520, and an image capture parameters portion 540. The basic features tab 500 also includes an instance of a "How Do I" button 430. The "How Do I" button 430 is usable to access an operating instructions help function, which is disclosed in greater detail in the incorporated 266 application.

In particular, the scan ticket portion 510 includes a status icon 512 that indicates the saved status of the scan ticket indicated in a scan ticket selection box 514. The current image capture parameters input into each of the basic features tab 500, the image quality tab 410 and the image size tab 550 can be saved to the scan ticket named in the scan ticket dialogue box 514 by selecting the save scan ticket button 516. The named scan ticket displayed in the scan ticket dialogue box 514 can be deleted by selecting the delete scan ticket button 517. The show scan ticket button 518 allows the user to quickly view all of the currently loaded scan settings in a text list. This allows the user to view the information on every setting without having to navigate all of the various dialogues in the various portions of the graphical user interface 400.

The original document parameters portion 520 of the basic features tab 500 includes a scan location list box 522, a page size list box 524, a double-sided check box 526, and an image quality profile list box 528. The original document portion 520 also includes a document orientation portion 530, described in greater detail below, that allows the user to specify how the document will be oriented on the platen 120 of the image capture device 100.

The image quality profile list box 528 allows the user to select an image quality profile. As indicated in the incorporated 269 application, each image quality profile is a collection of all the settings on the image quality tab and the various dialogue boxes and other graphical user interface widgets that are accessed through the image quality tab. In particular, the image quality profile list box 528 will include the same image quality profiles as will be provided on the image quality tab. When an image quality profile is selected using the image quality profile list box 528, the image quality profile parameters displayed in the various portions of the image quality tab will be change accordingly.

The image capture parameters portion 540 of the basic feature tab 500 includes a mode list box 542, a resolution list box 544, and an optimize image list box 546. The mode list box 542 allows the user to select the output mode of the image capture device 100. It should be appreciated that the particular modes displayed when the mode list box 542 is selected will depend on the particular image capture device identified in the scan location list box 522 and the particular modes available with that particular image capture device. The possible modes, include, but are not limited to, 1-bit or black/white captured images, 8-bit or grayscale captured images, or various types of 24-bit captured images, including red/green/blue (RGB) color, standard red/green/blue (sRGB) color and Luminance/Blue Chromaticity/Red Chromaticity (YCbCr) color.

The resolution list box 544 allows the user to select the output resolution of the captured image, in dots per inch (dpi). The optimize image list box 546 allows the user to select the output device for which the various captured image quality parameters on the image quality tab 410 should be set to so that the captured image, when printed on the selected output device, will provide the highest quality output image. In particular, in one exemplary embodiment, when a printer is selected in the optimize image list box 546, the tone reproduction curve (TRC) for the 1-bit (black/white) mode is selected as the tone reproduction curve for the indicated printer.

In particular, the document orientation portion 530 includes a short edge first/long edge first (SEF/LEF) toggle button 532, a rotate button 534 and an input document mimic portion 550. The SEF/LEF toggle button 532 allows the user to indicate whether the first edge of the original document to be introduced into the document handler 130 of the image capture device 100 is the long edge, such as the 11 inch edge of standard 8½×11 inch paper, or the short edge, i.e., 8½ edge of standard 8½×11 inch paper. In particular, the user will be expected to feed the original document into the document handler 130 or place it on the platen 110 in the same orientation as specified in the graphic displayed on the SEF/LEF toggle button.

The rotate button 534 allows the user to specify the orientation of the image on the input document. That is, the user may be providing the original document to the document handler using the long edge first orientation while the image has been placed onto that original document in a landscape orientation. In this case, by activating the rotate button 534, the rotate button 534 indicates that the input image orientation is rotated 90° clockwise. This is discussed in greater detail below.

The input document mimic portion 550 is a graphic that assists the operator in putting the document into the scanner correctly to receive the desired output. That is, the input document mimic portion 550 can be used by the user to precisely identify to the image capture device the paper size and feed direction of the original document to be scanned, as well as the image orientation, so that the captured images will be returned to the calling application in the desired orientation.

A document orientation portion 551 and an image orientation portion 552 of the input document mimic portion 550 indicate, in conjunction with the SEF/LEF toggle button 532 and the rotate button 534, the orientation the original document needs to be placed into on the image capture device in order to obtain an "upright" oriented captured image. An upright oriented captured image is an image that has the orientation of the graphic 482 shown in the preview pane portion 480 of the graphical user interface 400 shown in FIG. 6. Thus, for example, for a captured text image, the text of the captured image is upright if the bottom-most portions of the text characters are aligned with, and are closest to, the bottom edge 483 of the page mimic 482 of the preview pane portion 480 shown in FIG. 6.

The input document mimic portion 550 has two modes which can be selected by the user. In a default, "program sides and orientation" mode, the user is able to select whether to feed the original documents into the image capture device using either the short edge first (SEF) orientation or the long edge first (LEF) orientation. The user is also able to select the orientation of the original image on the piece of paper using the rotate button 534. The user selects the long edge first or short edge first orientation using the SEF/LEF toggle button 532. In particular, pressing the SEF/LEF toggle button 532 first selects one of the long edge first or short edge orientations. Then, pressing the SEF/LEF button again switches to the other of the short edge first or long edge first orientations.

Figure 7:
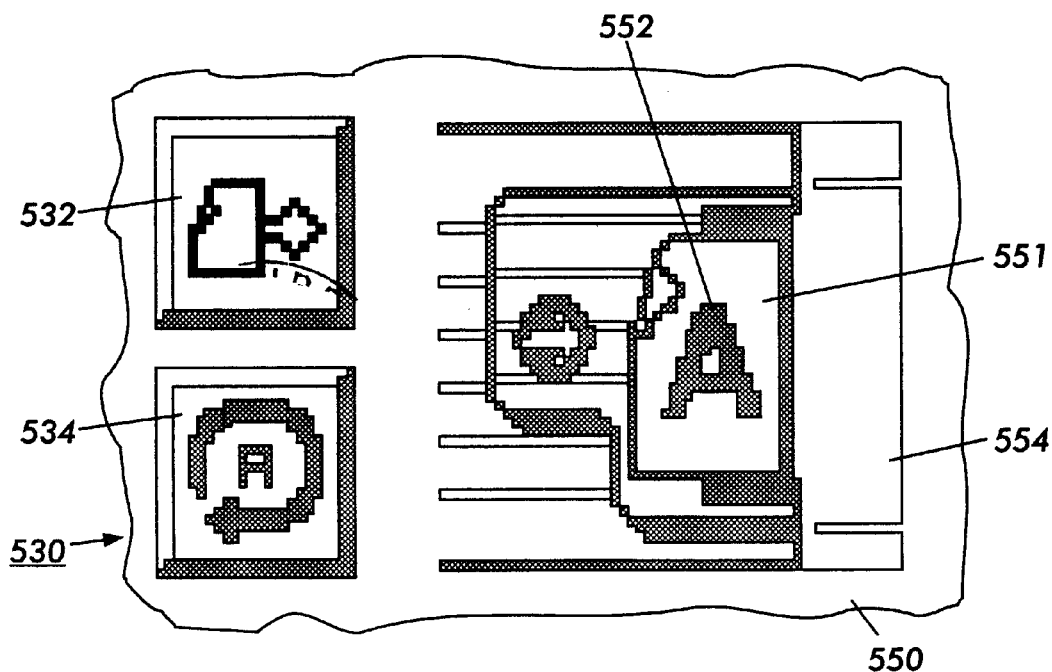
FIGS. 7–12 show in greater detail various exemplary embodiments of document orientation visual cues usable with the document orientation portion of the graphical user interface shown in FIG. 6.
Figure 8:
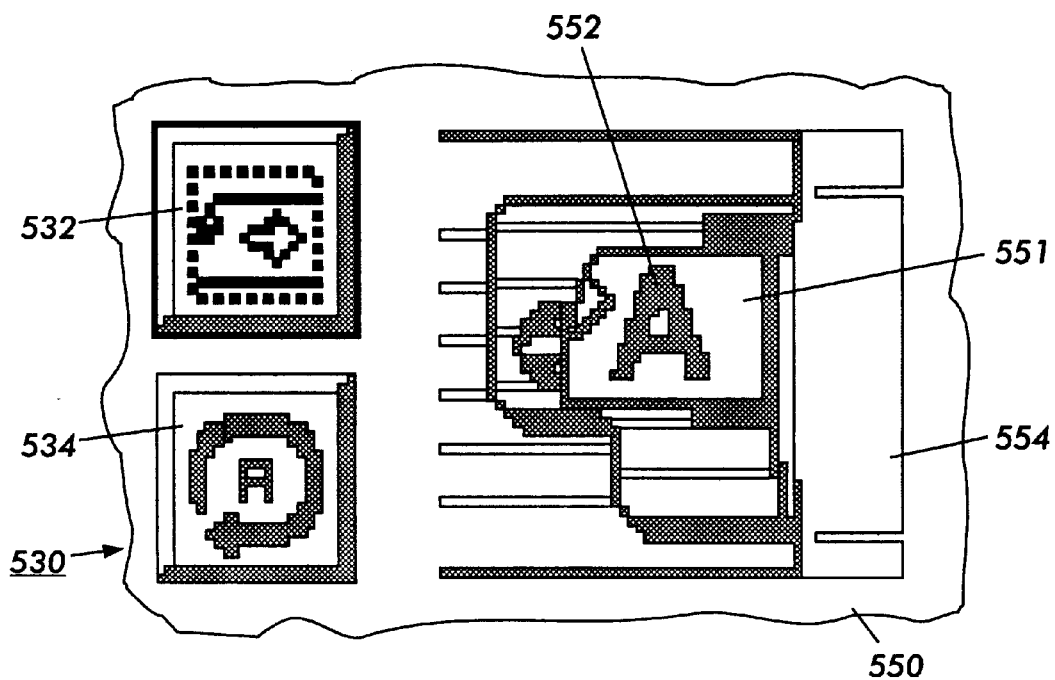

FIG. 7 shows the SEF/LEF toggle button 532 and the document orientation portion 551 and the image orientation portion 552, with the current state of the SEF/LEF button 532 and the document orientation portion 551 indicating the original document should be in the long edge first orientation. FIG. 8 shows the results of a user selecting the SEF/LEF toggle button 532, to charge the current orientation for feeding the original document into the image capture device from the long edge first orientation to the short edge first orientation. This is shown graphically by the SEF/LEF button 534, a document handler graphic 554, and the document orientation portion 551 in FIG. 8. It should be appreciated that, when the SEF/LEF button 532 is pressed, the graphics displayed for the SEF/LEF button 532 and the document orientation portion 551 change to provide visuals cues to the user of the currently selected orientation of the original document that will result in an upright captured image.

Figure 9:
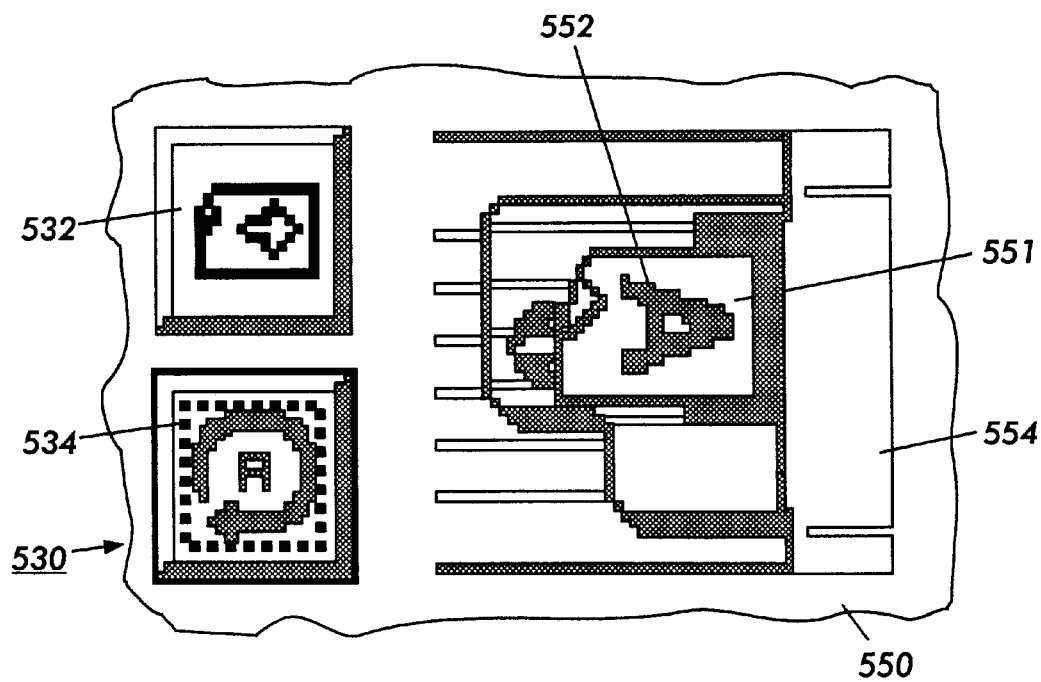

Using the rotate button 534, the user indicates which way the image is oriented on the original document. FIG. 8 shows the input originals with the image oriented so that the top of the image is aligned with a long edge of the original document. This is commonly referred to as the "landscape" orientation. As shown in FIGS. 8 and 9, when the user selects the rotate button 534, the image orientation portion 552 of the input document mimic portion 550 rotates 90° to indicate that the originals are being fed into the scanner with the top of the image oriented toward a short edge of the original document. This is commonly referred to as the "portrait" orientation. It should be appreciated that the rotate button 534 can be pressed repeatedly to rotate the image orientation portion 552 in 90° increments to allow the user to feed originals whose images have their top toward either short edge, or toward either long edge, of the input image.

After the user indicates how the original document will be fed into the document handler, either short edge first or long edge first, and indicates how the image is oriented on the original document, the user then proceeds to insert the original into the feeder as indicated and the image capture device captures an image of the original document. As a result, if the original image is fed into the image capture device as indicated by the document orientation portion 551 of the input document mimic portion 550, with the image oriented as indicated by the image orientation portion 552 of the input document mimic portion 550, the captured image will be returned to the user in an upright orientation.

Figure 10:
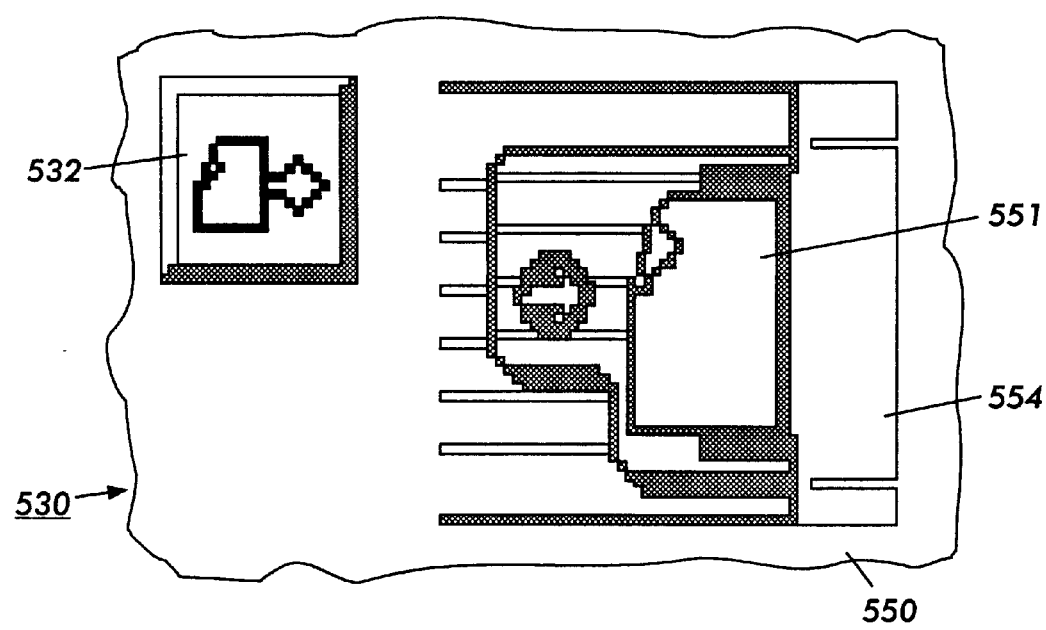

The second mode for the input document mimic portion is a "program sides only mode". FIG. 10 illustrates one exemplary embodiment of the document orientation portion 530' for the program sides only mode. As shown in FIG. 10, the document orientation portion 530' omits the rotate button 534 that appears next to the input document mimic portion 550 of the document orientation portion 530 shown in FIGS. 7–9. Additionally, the input document mimic portion 550 of the document orientation portion 530' also omits the image orientation portion 551 of the input document mimic portion 550 shown in FIGS. 7–9. In this program sides only mode, the user only chooses whether the original document will be fed short edge first or long edge first, using the SEF/LEF toggle button 532. The image of the original document will be captured with no concern for the orientation of the image on the original document. The captured image may therefore appear upside down, or rotated 90° when displayed in the preview pane portion 480. This reflects a more "copier-like" behavior, where an image put into a copier upside-down will come out upside-down.

Thus, as indicated above and as shown in FIGS. 7–9, in the program sides and orientation mode, the input document graphics, comprising an image orientation portion 551 and a document orientation portion 552, of the input document mimic portion 550 will be altered so that the input document graphics indicate to the user the selected orientations of both the long or short edges of the input document and the image on the original document relative to the selected long edge first or short edge first orientation of the original document.

In the program sides only mode, the input document graphics comprising only the document orientation portion 551 of the input document mimic portion 550, will be altered so that the input document graphics indicate to the user the selected orientation of the long and short edges of the input document.

It should be appreciated that, in FIGS. 6–10, the input document mimic portion 550 indicates that the user has selected to use an automatic document handler of the image capture device, such as the document feeder 130 of the scanner 100 shown in FIG. 1. However, the user may not wish to use the automatic document handler, but rather may wish to place the original document by hand onto the platen of the image capture device, such as the platen 120 of the image capture device 100 shown in FIG. 1. In this case, selecting the input document mimic portion 550 changes the displayed input document graphics from those for the document handler graphic 554 shown in FIGS. 7–9 to those for the hand placement graphic 556 shown in FIG. 11. Again, the displayed input document graphics of the input document mimic portion 550 indicate the correct orientation of the original document on the platen that will result in an upright captured image. As indicated above, selecting the desired mode and, depending on the selected mode, selecting the desired states for the SEF/LEF toggle button 532 and the rotate button 534, will change the orientation of the original document in the hand placement graphic 556 shown in FIG. 11.

Figure 11:
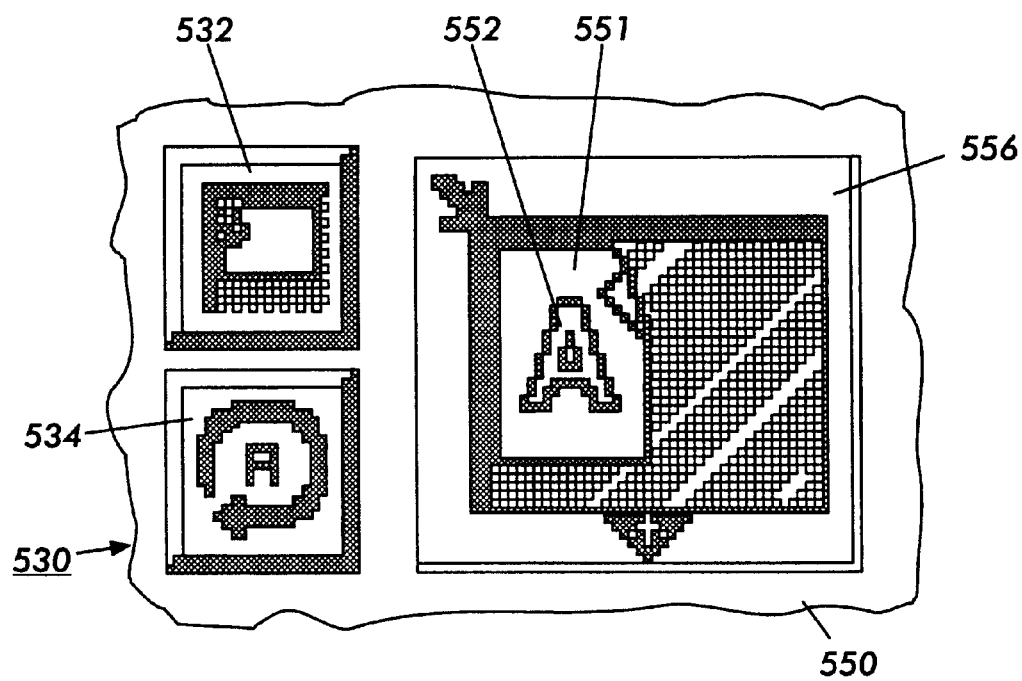
Figure 12:
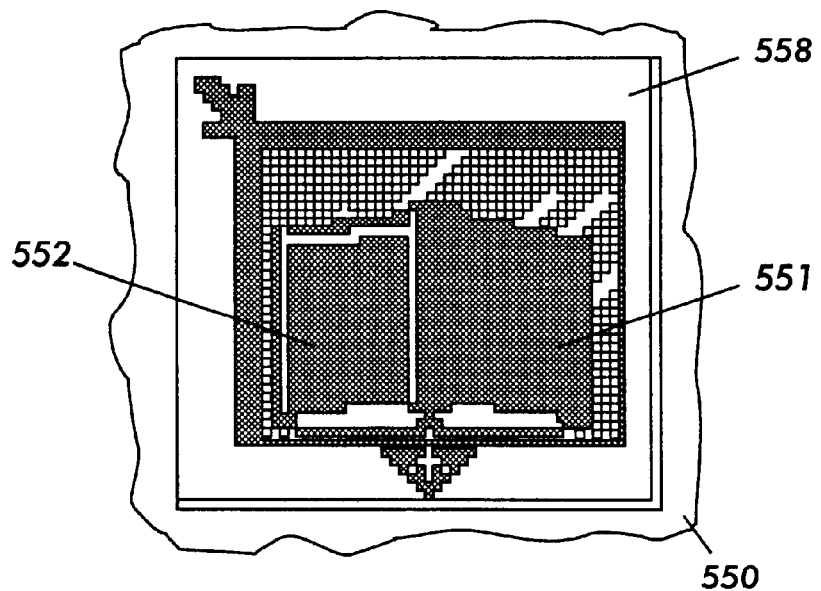

If the user wishes to capture an image from a bound original document instead of capturing a captured image from a single sheet original document, the user can again select the input document mimic portion 550 to again change the displayed input document graphics from the hand placement graphic 556 shown in FIG. 11 to a bound document graphic 558, as shown in FIG. 12. As in the automatic document handler graphic 554 and the hand placement graphic 556, the bound document graphic 558 visually indicates to the user how the bound document is to be placed onto the platen of the image capture device in order to obtain an upright captured image. It should be appreciated that, in various exemplary embodiments, depending on the selected mode, the states of the SEF/LEF toggle button 532 and the rotate button 534, the orientation of the bound document orientation portion 551 and/or the image orientation portion 552, in the bound document graphic 550 will change so that a visual indication is provided to the user of the orientation of the bound document and the image of the bound document being captured.

Figure 13A:
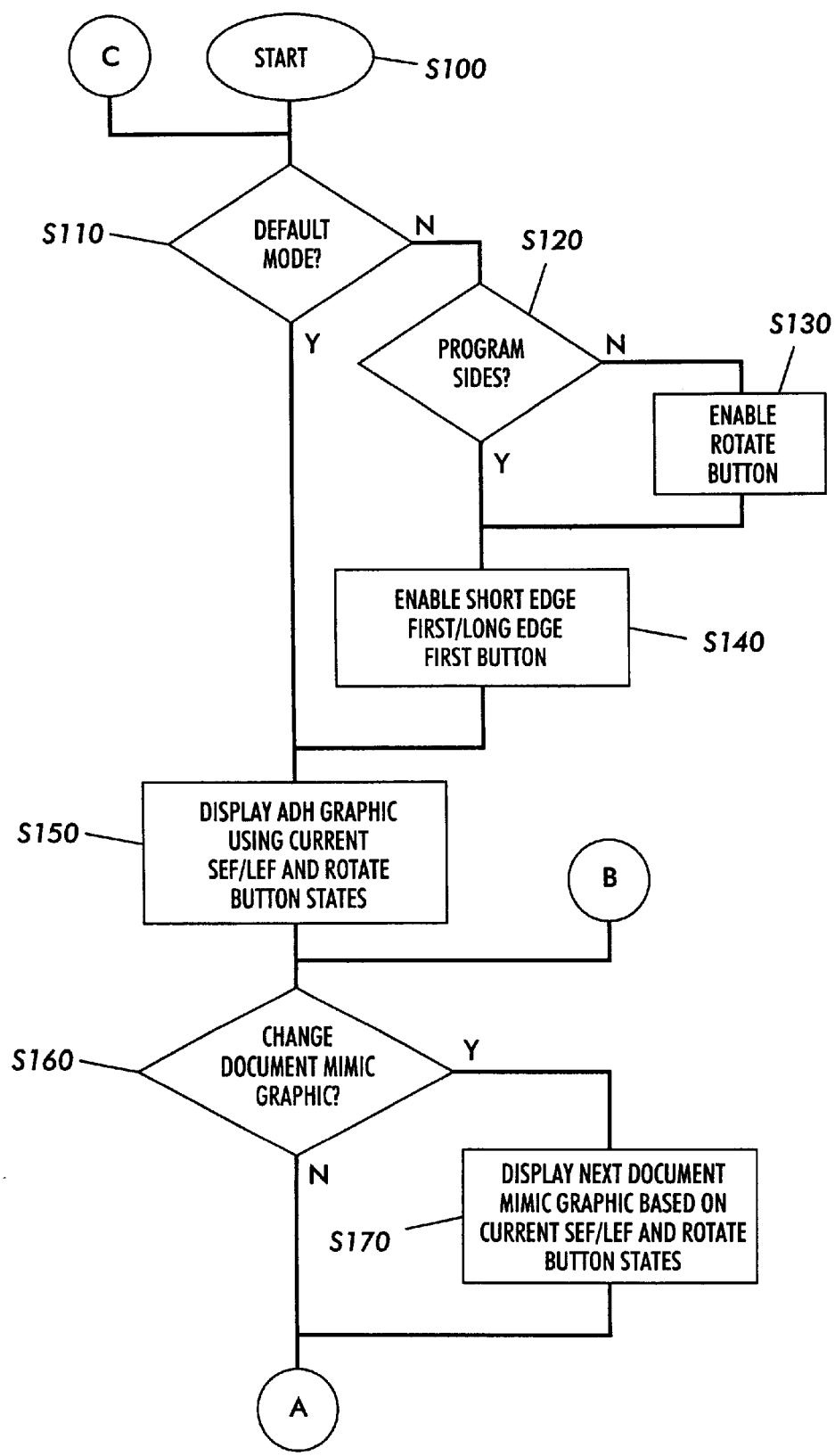
FIGS. 13A and 13B are a flowchart outlining one exemplary embodiment of a method for generating, displaying and using the document orientation portion and visual cues according to this invention.
Figure 13B:
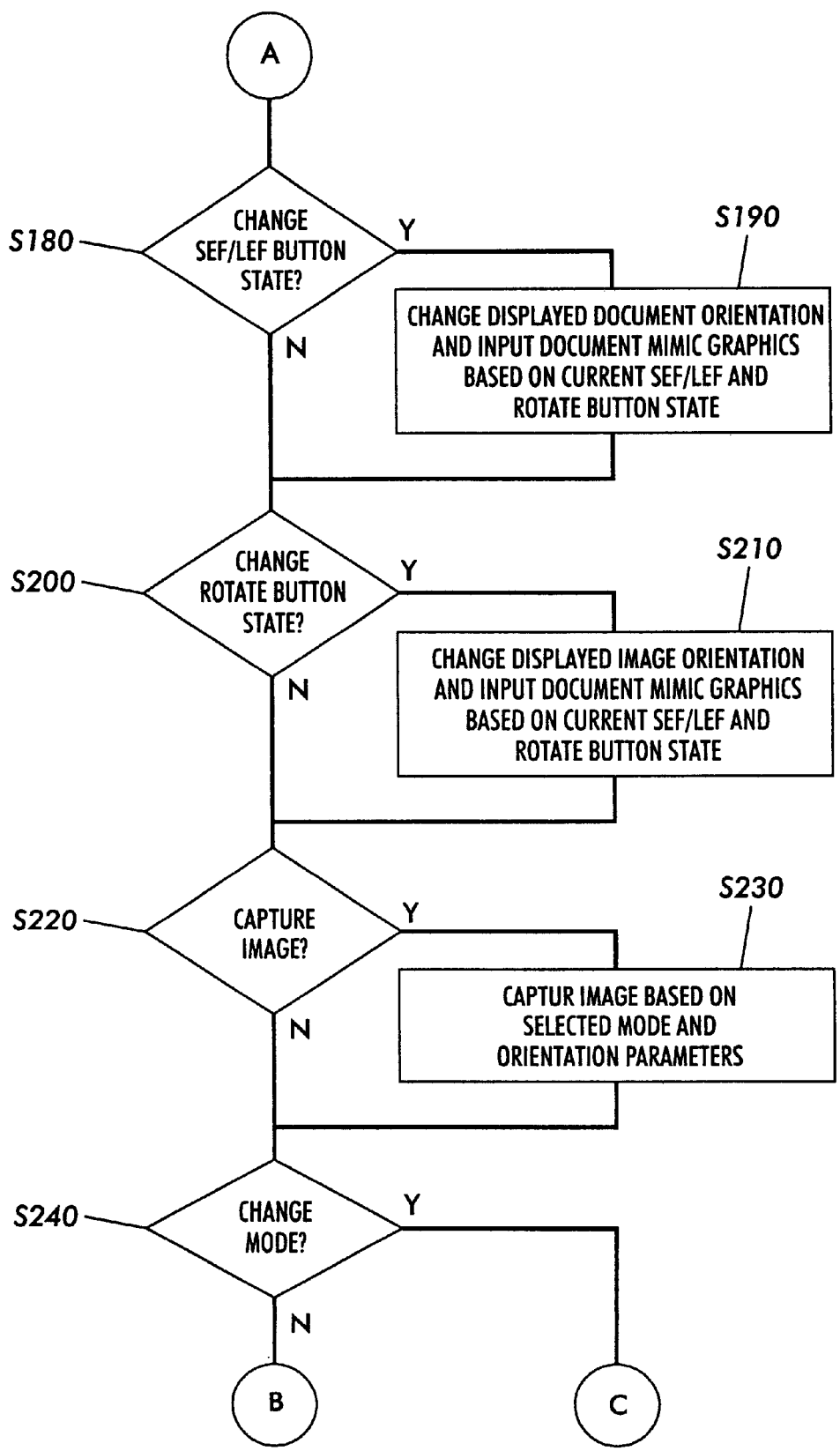

FIGS. 13A and 13B are a flowchart outlining one exemplary embodiment of a method for selecting the image orientation parameters and for using the selected image orientation parameters to capture an image from an original document according to this invention.

Control begins in step S100, upon displaying the graphical user interface that contains the image orientation widgets according to this invention. Next, in step S110, a determination is made whether the default mode has been selected. If so, control jumps directly to step S150. Otherwise, control continues to step S120.

In step S120, a determination is made whether the "program sides" mode has been selected. If not, then the "program sides and image orientation" mode has been selected, and control thus continues to step S130. Otherwise, control jumps directly to step S140.

In step S130, the rotate button is enabled. Then, in step S140, the SEF/LEF button is enabled. Next, in step S150, the automatic document feeder graphic is displayed using the current states of the SEF/LEF button and the rotate button. In particular, if the default mode is selected, the states of the SEF/LEF and rotate buttons are the default states for the particular image capture device that has been selected and cannot be changed. In contrast, in the other modes, the actual states of the SEF/LEF button and/or the rotate button are used to determine visual cues in the particular document orientation portions and the image orientation portions of the automatic document handler graphic. Control then continues to step S160.

In step S160, a determination is made whether the user wishes to change the input document graphic of the input document mimic. If so, control continues to step S170. Otherwise, control jumps directly to step S180. In step S170, the next input document graphic is displayed in the input document mimic portion using the current states for the SEF/LEF and rotate buttons. In particular, in the exemplary embodiments discussed above, if the current input document mimic is the document handler graphic, the next input document graphic is the hand placement graphic, then the bound document graphic and then back to the document feeder graphic. It should be appreciated that, if the particular image capture device selected by the user has more or fewer available operational modes, such as lacking an automatic document feeder or having both a recirculating document feeder and a bypass document feeder, different series of displayed input document mimic graphics can be displayed.

Similarly, different orders of the input document graphic can be used. Control then continues to step S180.

In step S180, a determination is made whether the user has changed the state of the SEF/LEF button. If so, control continues to step S190. Otherwise, control jumps directly to step S200. In step S190, the currently displayed input document graphic is updated to change the graphics displayed in the document orientation portion and the image orientation portion of the input document graphic, based on the newly selected state of the SEF/LEF button. Control then continues to step S200.

In step S200, a determination is made whether the rotate state has changed. If so, control continues to step S210. Otherwise, control jumps to step S220. In step S210, the currently displayed input document graphic is updated to change the graphics displayed in the document orientation and image orientation portions of the current input document graphic, based on the new rotate state. Control then continues to step S220.

In step S220, a determination is made whether the user has input or command to scan the next input document using the currently selected short or long edge first and rotation parameters, as indicated by input document mimic portion of the graphic user interface. If so, control continues to step S230, where an image is captured of the next input document based on these selected image capture parameters, among others. Control then continues to step S240.

In step S240, a determination is made whether the user has selected to change the currently selected document orientation mode. If so, control jumps to step S110. Otherwise, control jumps back to step S160.

As shown in FIGS. 13A and 13B, the method outlined in FIGS. 13A and 13B continues indefinitely so long as the graphical user interface containing the image orientation widgets discussed above is active.

It should be appreciated that the image capture device control systems 200 and 600 shown in FIGS. 2 and 5 can each be implemented on a general purpose computer. However, it should also be appreciated that the image capture device control systems 200 and 600 can also each be implemented on a special purpose computer, a programmed microprocessor or microcontroller and peripheral integrated circuit elements, an ASIC or other integrated circuit, a digital signal processor, a hardwired electronic or logic circuit such as a discreet element circuit, a programmable logic device such as a PLD, PLA, FPGA and/or PAL, or the like. In general, any device, capable of implementing a finite state machine, that is in turn capable of implementing the flowchart shown in FIGS. 13A and 13B, can be used to implement either of the image capture device control systems 200 or 600.

The memory 630 shown in FIG. 5 can include both volatile and/or non-volatile alterable memory or non-alterable memory. Any alterable memory can be implemented using any combination of static or dynamic RAM, a hard drive and a hard disk, flash memory, a floppy disk and disk drive, a writable optical disk and disk drive, or the like. Any non-alterable memory can be implemented using any combination of ROM, PROM, EPROM, EEPROM, an optical CD-ROM disk, an optical ROM disk, such as a CD-ROM disk or a DVD-ROM disk and disk drives, or the like.

Thus, it should be understood that each of the elements of the image capture device control systems 200 and 600 shown in FIGS. 2 and 5 can be implemented as portions of a suitably programmed general purpose computer. Alternatively, each of the elements shown in FIGS. 2 or 5 can be implemented as physically distinct hardware circuits within a ASIC, or using a FPGA, a PLD, a PLA, or a PAL, or using discreet logic elements or discreet circuit elements. The particular form each of the elements of the image capture device control systems 200 or 600 shown in FIGS. 2 and 5 will take as a design choice and will be obvious and predictable to those skilled in the art.

Moreover, the image capture device control systems 200 or 600 can each be implemented as software executing on a programmed general purpose computer, a special purpose computer, a microprocessor or the like. In this case, the image capture device control systems 200 and 600 can be implemented as routines embedded in a peripheral driver, as a resource residing on a server, or the like.

The image capture device control systems 200 and 600 can each also be implemented by physically incorporating them into a software and/or hardware system, such as the hardware and software systems of a digital copier or the like.

While this invention has been described in conjunction with the exemplary embodiments outlined above, it is evident that many alternatives and modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An image capture control system for an image capture device, comprising:

a controller that provides control parameters to the image capture device, the image capture device having at least one orientation control object and able to capture an image from an original document based on the provided control parameters, the control parameters including orientation control parameters being indicated by the at least one orientation control object and indicating at least one of an orientation of the original document and an orientation of an image on the original document that will result in an upright captured image, wherein the control parameters are selected before capturing the image; and a display device, an input document mimic displayable on the display device, the input document mimic indicating a current state of at least one of the orientation control parameters of the image to be captured;

wherein the input document mimic displays a graphic having an orientation and corresponding to the image to be captured, wherein the orientation of the graphic changes based on a selection of the control parameters before capturing the image to provide visual guidance for placing the original document.

2. The image capture control system of claim 1, wherein the input document mimic comprises at least one of a document orientation portion, an image orientation portion and a supply method portion.

3. The image capture control system of claim 2, wherein the document orientation portion indicates whether the original document should be provided to the image capture device in a short-edge-first orientation or a long-edge-first orientation so that the captured image will have an upright orientation.

4. The image capture control system of claim 3, wherein the input document mimic further comprises a selectable document orientation control element.

5. The image capture control system of claim 4, wherein, when the selectable document orientation control element is selected, the current state of a document orientation control parameter changes between the short-edge-first orientation and the long-edge-first orientation.

6. The image capture control system of claim 3, wherein the image orientation portion indicates, relative to a document orientation indicated by the document orientation portion, an orientation of the image on the original document that will result in an upright captured image when the original document is provided to the image capture device in the indicated document orientation.

7. The image capture control system of claim 6, wherein the input document mimic further comprises a selectable image orientation control element.

8. The image capture control system of claim 7, wherein, when the selectable image orientation image is selected, the current state of an image orientation control parameter changes.

9. The image capture control system of claim 2, wherein the supply method portion comprises at least one of a first graphic that indicates that the original document will be provided to the image capture device using an automatic document feeder, a second graphic that indicates that the original document will be provided manually to the image capture device, and a third graphic that indicates that the original document will be provided manually to the image capture device as part of a bound document.

10. The image capture control system of claim 9, wherein the supply method portion is selectable, and, when the supply method portion is selected, a next one of at least the first, second and third graphics is displayed as part of the supply method portion.

11. The image capture control system of claim 10, wherein, when the selectable supply method portion is selected to change the displayed one of at least the first, second and third graphics, the at least one of the document orientation portion and the image orientation portion are altered to correspond to the selected one of at least the first, second and third graphics.

12. A method for controlling an image capture device, comprising:
providing control parameters to the image capture device, the capture device having at least one orientation control object, the control parameters including orientation control parameters being indicated by the at least one orientation control object and indicating at least one of an orientation of the original document and an orientation of an image on the original document that will result in an upright captured image, wherein the control parameters are selected before capturing the image, comprising:
displaying an input document mimic on a display device, the input document mimic indicating a current state of at least one of the orientation control parameters of the image to be captured,
determining if the current state of the at least one orientation control parameter indicated by the input document mimic will result in a desired captured image,
altering, if the current state of the at least one orientation control parameter will not result in a desired captured image, the current state of at least one of the orientation control parameters, and
updating the displayed input document mimic displayed on the display device based on the current state of the at least altered one orientation control parameter; and
capturing an image from an original document based on the provided control parameters,
wherein displaying the input document mimic comprises displaying a graphic having an orientation and corresponding to the image to be captured, wherein the orientation of the graphic changes based on a selection of the control parameters before capturing the image to provide visual guidance for placing the original document.

13. The method of claim 12, wherein the input document mimic comprises at least one of a document orientation portion, an image orientation portion and a supply method portion.

14. The method of claim 13, wherein the document orientation portion indicates whether the original document should be provided to the image capture device in a short-edge-first orientation or a long-edge-first orientation so that the captured image will have an upright orientation.

15. The method of claim 14, wherein the input document mimic further comprises a selectable document orientation control element.

16. The method of claim 15, wherein altering the current state of at least one of the orientation control parameters comprises:
selecting the selectable document orientation control element; and
changing the current state of a document orientation control parameter between the short-edge-first orientation and the long-edge-first orientation.

17. The method of claim 14, wherein the image orientation portion indicates, relative to a document orientation indicated by the document orientation portion, an orientation of the image on the original document that will result in an upright captured image when the original document is provided to the image capture device in the indicated document orientation.

18. The method of claim 17, wherein the input document mimic further comprises a selectable image orientation control element.

19. The method of claim 18, wherein altering the current state of at least one of the orientation control parameters comprises:
selecting the selectable image orientation control element; and
changing the current state of an image orientation control parameter.

20. The method of claim 13, wherein the supply method portion comprises at least one of a first graphic that indicates that the original document will be provided to the image capture device using an automatic document feeder, a second graphic that indicates that the original document will be provided manually to the image capture device, and a third graphic that indicates that the original document will be provided manually to the image capture device as part of a bound document.

21. The image capture control system of claim 20, wherein:
the supply method portion is selectable; and
altering the current state of at least one of the orientation control parameters comprises:
selecting the selectable supply method portion; and
in response, changing the current state of at least one of a document orientation control parameter and an image orientation control parameter.

22. The method of claim 21, further comprising, in response to selecting the selectable supply method portion:
displaying a next one of at least the first, second and third graphics as part of the supply method portion; and altering the at least one of the document orientation portion and the image orientation portion to correspond to the displayed one of at least the first, second and third graphics.

23. A graphical user interface displayable on a display device of an image capture control system for an image capture device, the image capture device having at least one orientation control object and able to capture an image from an original document based on control parameters, the control parameters including orientation control parameters being indicated by the at least one orientation control object and being selected before capturing the image, the graphical user interface comprising:

an input document mimic that indicates a current state of at least one of an orientation of the original document and an orientation of an image on the original document that will result in an upright captured image of the image to be captured, wherein the input document mimic displays a graphic having an orientation and corresponding to the image to be captured, wherein the orientation of the graphic changes based on a selection of the control parameters before capturing the image to provide visual guidance for placing the original document.

24. The graphical user interface of claim 23, wherein the input document mimic comprises at least one of a document orientation portion, an image orientation portion and a supply method portion.

25. The graphical user interface of claim 24, wherein the document orientation portion indicates whether the original document should be provided to the image capture device in a short-edge-first orientation or a long-edge-first orientation so that the captured image will have an upright orientation.

26. The graphical user interface of claim 25, wherein the input document mimic further comprises a selectable document orientation control element.

27. The graphical user interface of claim 26, wherein, when the selectable document orientation control element is selected, the current state of a document orientation control parameter changes between the short-edge-first orientation and the long-edge-first orientation.

28. The graphical user interface of claim 25, wherein the image orientation portion indicates, relative to a document orientation indicated by the document orientation portion, an orientation of the image on the original document that will result in an upright captured image when the original document is provided to the image capture device in the indicated document orientation.

29. The graphical user interface of claim 28, wherein the input document mimic further comprises a selectable image orientation control element.

30. The graphical user interface of claim 29, wherein, when the selectable image orientation image is selected, the current state of an image orientation control parameter changes.

31. The graphical user interface of claim 24, wherein the supply method portion comprises at least one of a first graphic that indicates that the original document will be provided to the image capture device using an automatic document feeder, a second graphic that indicates that the original document will be provided manually to the image capture device, and a third graphic that indicates that the original document will be provided manually to the image capture device as part of a bound document.

32. The graphical user interface of claim 31, wherein the supply method portion is selectable, and, when the supply method portion is selected, a next one of at least the first, second and third graphics is displayed as part of the supply method portion.

33. The graphical user interface of claim 32, wherein, when the selectable supply method portion is selected to change the displayed one of at least the first, second and third graphics, the at least one of the document orientation portion and the image orientation portion are altered to correspond to the selected one of at least the first, second and third graphics.

34. An image capture control system for an image capture device, comprising:

a controller that provides control parameters to the image capture device, the image capture device having at least one orientation control object and able to capture an image from an original document based on the provided control parameters, the control parameters including orientation control parameters being indicated by the at least one orientation control object and indicating at least one of an orientation of the original document and an orientation of an image on the original document that will result in an upright captured image, wherein the. control parameters are selected before capturing the image; and a display device, an input document mimic displayable on the display device, the input document mimic indicating a current state of at least one of the orientation control parameters of the image to be captured;

wherein the input document mimic displays a graphic having an orientation and corresponding to the image to be captured, wherein the orientation of the graphic changes based on a selection of the control parameters before the original document is placed on the image capture device for capturing the image to provide visual guidance for placing the original document.

35. The image capture control system of claim 34, wherein the at least one orientation control object comprises at least one icon operable to change, before the original document is placed on the image capture device, the orientation of the image being captured.

36. A method for controlling an image capture device, comprising:

providing control parameters to the image capture device, the capture device having at least one orientation control object, the control parameters including orientation control parameters being indicated by the at least one orientation control object and indicating at least one of an orientation of the original document and an orientation of an image on the original document that will result in an upright captured image, wherein the control parameters are selected before capturing the image, comprising:

displaying an input document mimic on a display device, the input document mimic indicating a current state of at least one of the orientation control parameters of the image to be captured, determining if the current state of the at least one orientation control parameter indicated by the input document mimic will result in a desired captured image, altering, if the current state of the at least one orientation control parameter will not result in a desired captured image, the current state of at least one of the orientation control parameters, and updating the displayed input document mimic displayed on the display device based on the current state of the at least altered one orientation control parameter; and capturing an image from an original document based on the provided control parameters, wherein displaying the input document mimic comprises displaying a graphic having an orientation and corresponding to the image to be captured, wherein the orientation of the graphic changes based on a selection of the control parameters before the original document is placed on the image capture device for capturing the image to provide visual guidance for placing the original document.

37. A graphical user interface displayable on a display device of an image capture control system for an image capture device, the image capture device having at least one orientation control object and able to capture an image from an original document based on control parameters, the control parameters including orientation control parameters being indicated by the at least one orientation control object and being selected before capturing the image, the graphical user interface comprising:

an input document mimic that indicates a current state of at least one of an orientation of the original document and an orientation of an image on the original document that will result in an upright captured image of the image to be captured, wherein the input document mimic displays a graphic having an orientation and corresponding to the image to be captured, wherein the orientation of the graphic changes based on a selection of the control parameters before the original document is placed on the image capture device for capturing the image to provide visual guidance for placing the original document.

\* \* \* \* \*